United States Patent Office 3,104,967
Patented Sept. 24, 1963

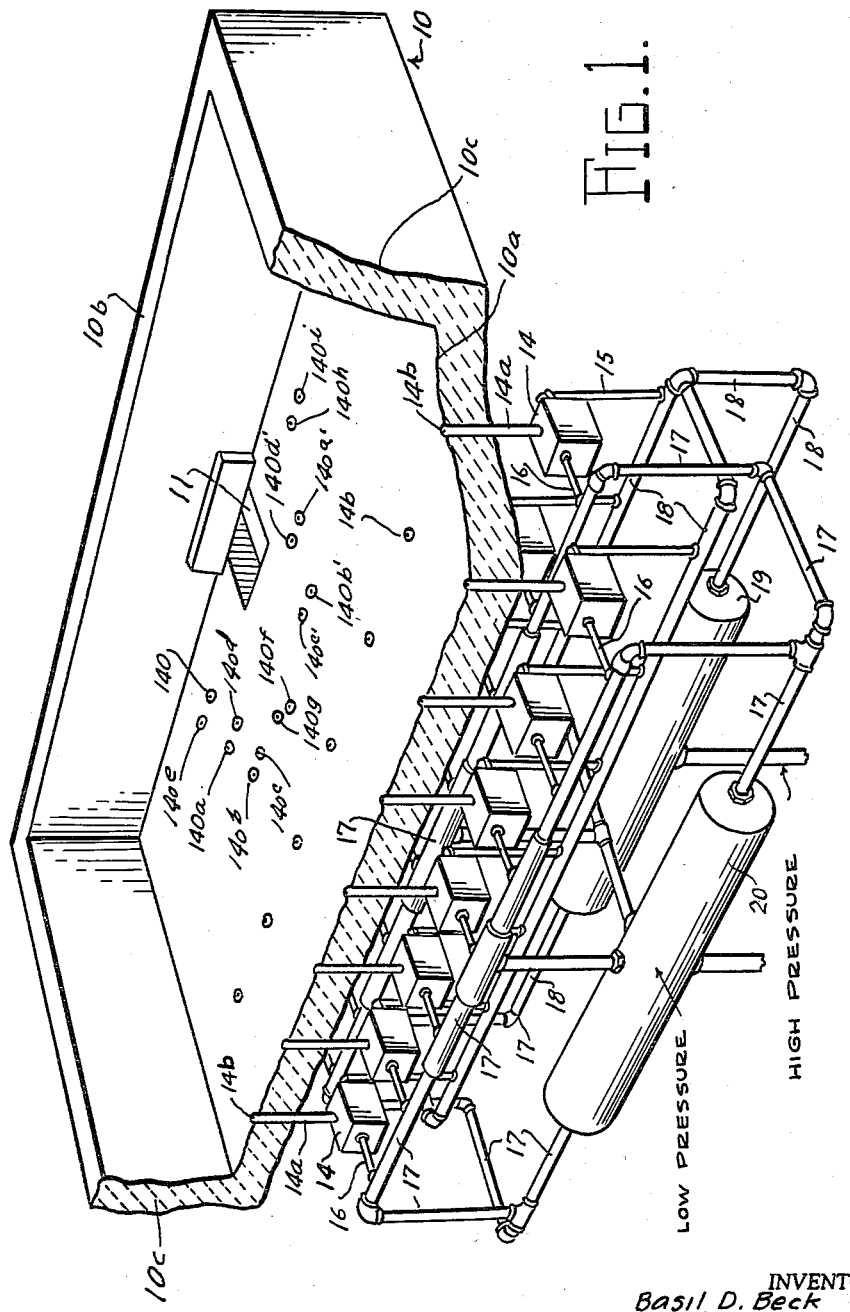

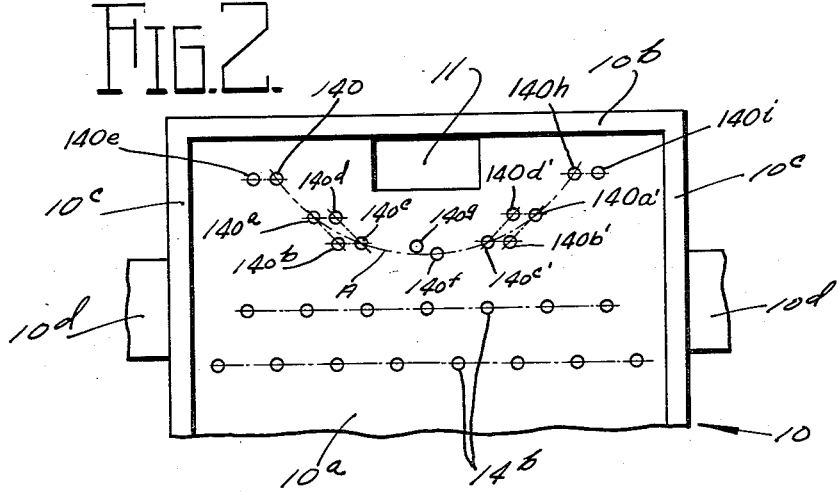
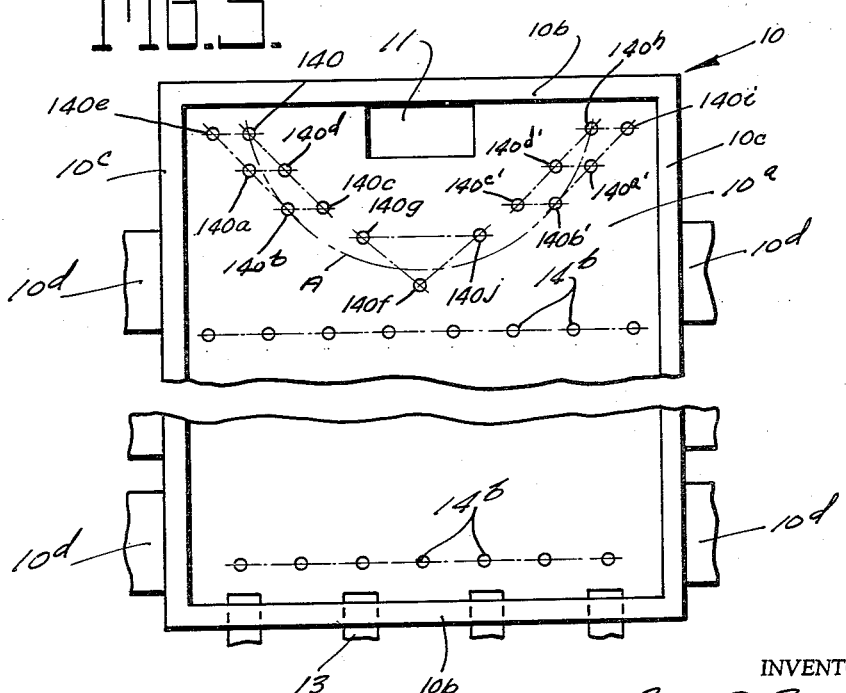

3,104,967
GLASS FURNACE BUBBLER PATTERNS
Basil D. Beck, Bridgeton, N.J., and Arthur B. Swain, Toledo, Ohio, assignors to Owens-Illinois Glass Company, a corporation of Ohio
Original application Nov. 13, 1956, Ser. No. 621,609, now Patent No. 2,909,005, dated Oct. 20, 1959. Divided and this application Apr. 1, 1959, Ser. No. 803,468
9 Claims. (Cl. 65—178)

This invention relates to the efficient utilization of bubblers in a glass furnace, and more particularly to the patterns of arrangement of these bubblers and a method for providing patterns of convection currents in the melting zone of a glass melting furnace to increase the efficiency and output of production of the furnace.

This application is a divisional application of copending application, now issued as U.S. Patent No. 2,909,005, dated October 20, 1959.

In this invention it is contemplated to provide a furnace or tank having interconnected glass containing compartments separated from each other by walls and interconnected by a submerged throat passage therebetween for the flow of molten glass from one compartment to the other.

Heat is supplied to the glass materials in the compartments of the furnace to maintain a body of molten glass therein. Within this body of molten glass, normal convection currents are present due to differentials in temperature and density throughout the glass body.

Also provided is a means for feeding the raw batch materials into the melter and bubbling means provided in the floor of the melter for stirring the molten glass by the formation of gaseous bubbles at the base of the glass body and causing the bubbles to rise therein. The rising action of the gaseous bubbles within the body of glass can be controlled by a pattern arrangement to create controlled curtains of convention currents which promote a more efficient melting cycle of the furnace, improve the quality of glass produced and increase its output.

The bubbles are formed by either a continuous or intermittent type bubbling device. The utility and mode of operation of each of the aforementioned type of bubblers is explained and disclosed in inventions of J. W. Wright; his U.S. Patent 2,387,222 covering the continuous type bubbler unit, and his U.S. patient entitled, "Means of Controlling Convection Currents of Molten Glass," U.S. Patent No. 2,890,548, dated June 16, 1959, copending herewith, covering the intermittent type bubbler unit.

It has been found in practice that various arrangements or patterns of placing the bubblers about the floor of the melter, regardless of the type of bubble producing unit utilized, produced, generally, increased efficiency and output or "pull" of the glass melter, along with the following specific improved results in the melter derived from such patterned arrangement of the bubblers, viz., (1) A more uniform homogeneity of the glass is produced,
(2) Certain types of stones such as nepheline and batch, are minimized,
(3) The temperature gradient in the glass body between the floor of the melter and the glass surface is decreased, thereby promoting increased melter efficiency,
(4) An increase in temperature of the glass in the refiner is obtained by increasing the temperature of the glass near the bottom of the melter,
(5) Any color or density separation is prevented from occurring in the melter in the production of colored glasses, such as emerald green and champagne green glasses,
(6) An increase in the loads is obtained in melting the aforementioned colored glasses, and
(7) Batch color streak or cord is eliminated in the production of lead-barium glass and borosilicate glass.

These patterns may be more effectively employed by utilizing a plurality of bubblers in groups of three or more placed closely together in the pattern so that the bubbles emitted from any one such group will assist one another in moving glass as they travel vertically therethrough from the floor of the melter to the surface of the molten glass body. In such arrangement, more pronounced currents are promoted for agitating or moving the glass. The mentioned groups of bubblers in any pattern may be arranged, for example, as the corners of a triangle, a square, a diamond or along the sides of a parallelogram or like geometric figure.

It is therefore an object of the present invention to provide installations of bubblers arranged in patterns along the floor of a glass melter which patterns achieve the aforementioned benefits for a glass furnace.

It is a further object of this invention to provide a method of advantageously controlling patterns of convection currents internally of the glass body contained in the glass melting zone of a furnace by subjecting the normal convection currents in said body to a specific pattern of motion influenced by a curtain-like pattern of rising gaseous bubbles within the glass body to obtain the aforementioned benefits for a glass furnace.

It is still a further object of this invention to provide an installation of bubblers arranged around the throat outlet of a glass melter, plus a plurality of staggered transverse rows throughout a major portion of the remainder of the melting zone of the melter in which the individual bubblers may be selectively controlled to be made operative or inoperative, and thereby produce predetermined alterable patterns of rising gaseous bubbles throughout the latter-mentioned transverse rows of bubblers to obtain the desired control over convection currents in the body of glass in the melter.

The specific nature of this invention, as well as other objects and advantages thereof, will become apparent to those skilled in the art from the following detailed description.

In the accompanying drawings:

FIG. 1 is a cutaway perspective view, showing a glass melter provided with a plurality of intermittent type bubbling units, their bubbling nozzles being arranged about the floor of the melter according to one pattern arrangement of the bubblers employed to illustrate the present invention.

FIG. 2 is a partial plan view of FIG. 1 which illustrates the location of the bubblers according to the present invention.

FIG. 3 is a partial plan view showing a second pattern arrangement of bubblers employed under the present invention.

In FIG. 1 the lower rectangular portion of a glass melter for containing molten glass is identified by reference numeral 10, and comprises adjoining floor 10ª, end walls 10ᵇ and side walls 10ᶜ. Melter 10 is supported by a conventional structure (not shown). The lower portion of the melter 10 supports an upper covering structure (not shown) in which are located opposed firing ports 10ᵈ (shown schematically only in FIGS. 2 and 3). At one end of melter floor 10ª, adjacent the central portion of end wall 10ᵇ, is located throat outlet 11 which communicates with a throat passage (not shown) leading to the refiner (not shown).

At the opposite end of melter 10 in the upper portion of its end wall 10ᵇ are dog houses 13 (shown only schematically in FIG. 3) utilized for feeding raw batch materials of a glass composition into melter 10. However, other means of batch feeding may be utilized with this invention, such as the overhead center type of batch feeding or blanket batch feeding over the top and along the length of the molten glass body.

Beneath melter floor 10$^a$ are interconnected a series of bubbler control units 14. These units 14 are each provided with a bubbler tube 14$^a$ terminating in a nozzle 14$^b$ or 14$^{b'}$ inserted into the molten glass body contained in the melter and interspersed about floor 10$a$ in distinct pattern arrangements, which patterns will be hereinafter described.

Bubbler control units 14 are each connected by conduits 15 to high pressure manifolds 18 and similarly connected by conduits 16 to low pressure manifolds 17. High pressure manifolds 18 and low pressure manifolds 17 are connected respectively, to high pressure tank 19 and low pressure tank 20. Pressure supplied to the bubbler units 14 from the high pressure tank 19 is maintained sufficiently to explode measured volumes of the pressured gas into the bottom of melter 10 and overcome any pressure head presented by the depth of the glass body over bubbler nozzle 14$^b$ or 14$^{b'}$.

The bubbler units shown in FIG. 1, operate to explode intermittently a series of enlarged gaseous bubbles, as shown and described by the aforementioned U.S. Patent 2,890,548 of J. W. Wright.

FIG. 2 illustrates the first pattern of the invention and is adaptable also to a continuous type bubbler system, which is shown and described in aforementioned U.S. Patent No. 2,387,222.

Either type bubbler system is an example of a bubble producing device that is readily adaptable for use with this invention to produce the gaseous bubbles at the bubbling nozzles. Let it be understood, therefore, that the subject of this invention contemplates the arrangement of bubblers about the melter floor to produce a pattern of bubbles rising in the molten glass of the melter by any form of satisfactory bubble-emitting apparatus. It is the pattern of distribution of the bubblers and not the specific bubbler utilized that fulfills the objects of this invention.

On the drawings, bubbler nozzles 14$^b$ and 140, 140$^{a-i}$ and 140$^{a'-d'}$ of bubbler units 14 are arranged in various patterns about the melter floor 10$^a$, such that the bubbles being injected into the glass rise in a chain, one after the other, to create movement of the glass in curtainlike patterns. This curtain-like movement of glass is utilized to provide controlled patterns of convection currents in the melting zone of the glass melting furnace. The contour of these curtains of moving glass is defined by the particular pattern arrangement of bubblers employed.

Broadly described, each of the patterns shown in the figures comprises a first array of bubbler nozzles 140, 140$^{a-i}$, and 140$^{a'-d'}$ disposed in a substantially arcuate arrangement on arc "A" around throat outlet 11 at one end of melter 10, and a second array of bubbler nozzles 14$^b$ longitudinally spaced from the first array of said nozzles in the direction away from the throat outlet 11, wherein the second array of bubbler nozzles includes, in each case, a plurality of bubblers extending substantially transversely of the melter floor 10$^a$.

On FIGS. 1 and 2 of the drawings, the first array of bubblers is arranged to have the bubbler nozzles 140, 140$^a$, 140$^c$, 140$^f$, 140$^{c'}$, 140$^{a'}$ and 140$^h$ along a substantially arcuate path "A" about throat outlet 11. The mentioned nozzles are at substantially equal distances from a point on the center line of the outlet 11. This arcuate arrangement is supplemented by additional bubblers 140$^d$, 140$^b$, 140$^{b'}$ and 140$^{d'}$ so as to describe a diamond shaped grouping of bubblers along the side portions of the aforementioned arc. The two diamond shaped groupings of bubblers are identifiable on the drawings as bubbler nozzles 140$^{a-d}$ at the left hand side of the furnace floor 10$^a$ (FIG. 2), and bubbler nozzles 140$^{a'-d'}$ at the right hand side of the furnace floor 10$^a$. Bubbler nozzles 140$^e$, 140$^g$ and 140$^i$ are paired respectively with bubbler nozzles 140, 140$^f$ and 140$^h$ to supplement them in generating motion of the glass vertically at those locations. This first array of bubbler nozzles, when gaseous bubbles are emitted therefrom, will provide a specific convection current motion in the molten glass at the forward end of the melter equally spaced from the throat. This provides increased convection current control over the molten glass near the entrance to throat outlet 11.

The arrangement shown in FIG. 1 contains the aforementioned arcuate first array of bubbler nozzles around throat outlet 11 and a second array comprising a pair of transverse rows of bubbler nozzles 14$^b$ spaced from each other towards the batch-feeding end of melter 10 near the central portion of melter floor 10$^b$. These bubbler nozzles may be positioned in staggered relationship, as shown, or may be in aligned relationship.

This arrangement of bubblers improves the melting of emerald green and champagne green glasses to greatly increase the furnace loads of the melter. The increased loads result in reduced stir losses brought about by the bubbling action of the second array of bubblers in this pattern, which comprises more than one transverse row of bubblers in the arrangement of said second array. A single row of bubblers is not sufficient to achieve this result, in that the bubbles are not produced fast enough to prevent the production of seeds in these glasses.

FIG. 3 represents another embodiment of the invention in which the second array of bubbler nozzles comprises a pair of transverse rows of bubblers 14$^b$, one transverse row being nearer the outlet end of the melter (throat outlet 11) and the other transverse row being adjacent the batch feeding end of the melter (dog-houses 13). The latter-mentioned row serves to assist distribution of batch fed to the surface of the molten glass body from doghouses 13 in that it keeps the added batch from sinking too soon after its addition near end wall 10$^b$. The first array of bubblers is arranged about throat outlet 11 on either side of an arc A, described about the center of outlet 11. In this embodiment the grouping of bubbler nozzles 140, 140$^d$, 140$^c$, 140$^b$, 140$^a$ and 140$^e$ at the left-hand side of the furnace floor 10$^a$ (FIG. 3) and the grouping bubbler nozzles 140$^h$, 140$^{d'}$, 140$^{c'}$, 140$^{b'}$, 140$^{a'}$ and 140$^i$ at the right-hand side of the furnace floor 10$^a$ (FIG. 3) are arranged at the sides of parallelograms that have their minor diagonal dimension disposed to lie nearly along the two end portions of arc A. Bubbler nozzles 140$^f$, 140$^g$ and 140$^j$ are arranged at the corners of a triangle centered at central portion of arc A. Thus, in this embodiment, the first array of bubblers is arranged about the throat in an arcuate arrangement (arc A) with the concentration of bubbler nozzles and accompanying glass moving ability varying along that arc. This arrangement provides for more motion in the glass near the sides of the furnace through the cooperating effects of the bubblers of the parallelogram groups thereat, and a lesser motion in the glass in the center zone of the melter directly in front of the throat. The three central bubblers in the triangular grouping (140$^f$, 140$^g$ and 140$^j$) will cooperate to move a column of glass at that location, but to a lesser extent than the two groups of bubblers in the parallelogram groupings in which the bubblers are located more closely together and provide more cooperation between them in moving the glass thereat. The two latter groupings of bubblers at the ends of arc A will provide more movement and turbulence in the colder glass near the sides and corners of the melter. The former grouping or bubblers will provide less movement and turbulence by comparison in the hotter glass that is approaching the throat outlet 11 from the front.

The various patterns of bubbler arrangements of the invention, as described above, contemplate in the main that increased furnace capacities and results are achieved by the utilization of bubbler patterns involving a first array of bubblers spaced substantially equally distances from the withdrawal throat and in addition thereto more than one (at least two) spaced rows of bubblers to comprise any given configuration or size of geometric pattern in the second array of bubblers.

The apparatus utilized in the invention is contemplated as being capable of injecting gas into the molten glass body to form bubbles therein enveloped by molten glass, the bubbles being of a density to steadily rise so that successive bubbles will produce a steady rising stream of glass which continuously breaks the surface of the molten glass body.

It will, of course, be understood that various other arrangements of the bubblers may be utilized by mere modifications through a wide range of form and size to create still further variations from the patterns shown and described herein without departing from the principles of this invention. It is, therefore, not the purpose to limit the patent granted hereon otherwise than necessitated by the scope of the appended claims.

We claim:

1. In a glass melting furnace for continuous production of molten glass comprising side walls and a bottom wall and having molten glass melting and fining compartments interconnected by an outlet passage, in combination an arrangement of a plurality of bubble-producing units serving in operation to produce rising columns of glass, said units each including a conduit defining an orifice disposed in the molten glass in the melting compartment below the glass surface, means for supplying gas to said conduit and thereby releasing gaseous bubbles at the orifice of the latter, the orifices of said plural units being angularly arranged about the bottom wall of said melting compartment such that some of them lie along an arcuate configuration that is disposed in concave relationship about said outlet passage of said compartment and the orifices of the remainder of said units grouped in close proximity to the said orifices that are located at the opposite end portions of said arcuate configuration so that gas issuing from said units forms bubbles which produce major agitation in the glass near said ends of the arcuate configuration and on either side of said outlet passage.

2. The glass melting furnace defined in claim 1, therein the orifices of said groups are disposed in relation to the orifices describing the opposite end portions of said arcuate configuration to define polygonal groupings, each being substantially central with respect to said end portions of the arcuate configuration.

3. The glass melting furnace defined in claim 1, wherein at least one orifice of said plural units is disposed intermediate said groups of orifices located along the end portions of said arcuate configuration and located in close proximity to said arcuate configuration.

4. The glass melting furnace defined in claim 2, wherein said orifice disposition of each polygonal grouping defines a diamond-shaped figure, two of the orifices at opposite corners thereof being orifices on said arcuate configuration, and two other orifices at the other opposite corners thereof lying on opposite sides of said arcuate configuration.

5. The glass melting furnace defined in claim 1, wherein, additionally, three orifices are disposed on either side of said arcuate configuration and intermediate the said groups at the opposite end portions of said arcuate configuration, said orifices being located as the corners of a triangle.

6. In an apparatus for providing controlled agitation in a workable molten mass in a glass furnace having interconnected melting and fining areas, said molten mass continuously moving from the melting area to the fining area through an interconnecting passage, a first group of gas introducing means in the bottom of the molten mass in the melting area operable for moving plural columns of glass vertically in said mass, this group of said means being in the bottom of the molten mass and spaced horizontally around the melting area in a substantially angular arrangement that is divergent about said passage, a second group of gas introducing means in the bottom of the molten mass in the melting area and arranged with respect to the first group of said means so as to be spaced apart and in the proximity of said first group of said means at the extremities of said angular arrangement of the latter and operated for moving plural columns of glass vertically in said mass, the first and second groups of said means cooperating to provide a major agitation in the glass mass at said extremities of said angular arrangement and a minor agitation at the glass mass at the intermediate portion of said angular arrangement.

7. Apparatus for providing controlled currents in a workable molten mass in the melting zone of a glass melting furnace wherein glass from said mass is being continuously withdrawn from said melting zone through a throat passage, comprising means for controlling the convection currents in said molten mass by subjecting the glass to specific patterns of motion generated by a plurality of gas introducing bubbler units in contact with the molten mass to produce rising columns of vertically moving glass, said patterns of motion being formed by having a portion of the plurality of said units arranged in an angular geometric pattern horizontally disposed about said throat passage, the included angle of said pattern being opposite and outwardly disposed from said passage, there being a greater number of said units at either end portion of said angular pattern than at the intermediate portion of said pattern, whereby a greater amount of glass agitation is provided at either end portion of said end pattern and at opposite sides of said passage, and the remainder of the bubbling units arranged to form at least two straight line rows that are horizontally spaced in said mass from the said pattern described by the first-named portion of said plural units.

8. In a glass melting furnace for continuous production of molten glass, said furnace including side walls and a bottom wall and having molten glass melting and refining compartments that are interconnected by a throat passage, and means in said melting compartment for heating the glass, thereby thermally creating convection current agitation, the combination of means for modifying said convection currents and operable to supplemental motion of the glass comprising a plurality of bubbling means serving in operation to cooperate and produce rising fountains of glass that vary in area, each said bubbling means comprising conduit means extending through the bottom wall of the melting compartment and defining an end orifice that is disposed below the glass surface, means for supplying a gas under pressure to the conduit means of each said bubbling means, said orifices thereof being arranged so that gas issuing therefrom forms successive bubbles in the molten glass which cooperate with one another to produce steadily rising movement of the glass which meets the surface of said molten glass body, said arrangement of the bubbling means orifices being in the glass in said melting compartment to define an angular array that is divergently disposed about the throat passage, there being a greater number of said orifices near each of the end portions of said angular array than at the central portion thereof so as to create a greater rising movement in the glass on either side of the throat passage than the rising movement in the glass created directly ahead of said throat passage.

9. The glass melting furnace defined in claim 8, wherein the bubbling means are grouped in said angular array on either side of said throat passage in a parallelogram-shaped arrangement, at least two orifices of the bubbling means of each parallelogram lying along an arc described about said throat passage, and other bubbling means orifices arranged at the center of said arcuate array and in front of said throat passage, the latter bubbling units being arranged such that they supply a lesser motion to the glass than the said bubbler units on either side of the throat passage of said parallelogram arrangements.

References Cited in the file of this patent

UNITED STATES PATENTS

| | | |
|---|---|---|
| 2,331,052 | Shadduck | Oct. 5, 1943 |
| 2,884,744 | Monks et al. | May 5, 1959 |
| 2,890,548 | Wright | June 16, 1959 |
| 2,909,005 | Beck et al. | Oct. 20, 1959 |